(12) United States Patent
Ehara et al.

(10) Patent No.: US 7,505,167 B2
(45) Date of Patent: Mar. 17, 2009

(54) INFORMATION PROCESSING APPARATUS, METHOD, AND COMPUTER PRODUCT, FOR FILE NAMING

(75) Inventors: Mikinori Ehara, Kanagawa (JP); Takezo Fujishige, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 913 days.

(21) Appl. No.: 10/912,078

(22) Filed: Aug. 6, 2004

(65) Prior Publication Data

US 2005/0063009 A1    Mar. 24, 2005

(30) Foreign Application Priority Data

Aug. 7, 2003    (JP)    ............... 2003-288928

(51) Int. Cl.
*G06F 15/00* (2006.01)
*G06F 12/00* (2006.01)
*G06K 1/00* (2006.01)

(52) U.S. Cl. .................. 358/1.16; 358/1.15; 382/181

(58) Field of Classification Search ............. 358/1.15, 358/1.16; 382/181
See application file for complete search history.

(56) References Cited

U.S. PATENT DOCUMENTS

| | | | | |
|---|---|---|---|---|
| 5,153,927 A | * | 10/1992 | Yamanari | 382/311 |
| 6,867,881 B1 | * | 3/2005 | Umezato | 358/1.2 |
| 2001/0012400 A1 | * | 8/2001 | Wang et al. | 382/181 |
| 2004/0080795 A1 | * | 4/2004 | Bean et al. | 358/505 |
| 2004/0119831 A1 | * | 6/2004 | Miyawaki | 348/207.99 |
| 2005/0078190 A1 | * | 4/2005 | Bloom et al. | 348/207.99 |

FOREIGN PATENT DOCUMENTS

| | | | |
|---|---|---|---|
| JP | 1-283670 | | 11/1989 |
| JP | 7-36941 | | 2/1995 |
| JP | 8-166959 | | 8/1996 |
| JP | 2001161199 A | * | 6/2001 |
| JP | 2002-297607 | | 10/2002 |
| JP | 2002-374481 | | 12/2002 |
| JP | 2003-179735 | | 6/2003 |

* cited by examiner

*Primary Examiner*—Twyler L Haskins
*Assistant Examiner*—Fred Guillermety
(74) *Attorney, Agent, or Firm*—Oblon, Spivak, McClelland, Maier & Neustadt, P.C.

(57) ABSTRACT

An information processing apparatus includes a character identifying unit that performs character identification with respect to an image in an image data. A file name setting unit sets a file name of the image data based on a character or a character string obtained as a result of the character identification.

26 Claims, 7 Drawing Sheets

INFORMATION PROCESSING APPARATUS, METHOD, AND COMPUTER PRODUCT, FOR FILE NAMING

CROSS-REFERENCE TO RELATED APPLICATIONS

The present document incorporates by reference the entire contents of Japanese priority document, 2003-288928 filed in Japan on Aug. 7, 2003.

BACKGROUND OF THE INVENTION

1. Field of the Invention

The present invention relates to an information processing apparatus that can automatically provide a name to an image file.

2. Description of the Related Art

A communication apparatus, such as a facsimile, that can automatically provide a name to a data file, which is received from outside or generated within itself, has been known. The name is decided based on identification information. The identification information is either transmitted according to a communication control procedure or a protocol procedure of the communication apparatus. For details see Japanese Patent Application Laid-open Publication No. 2003-179735.

In electrophotographic copy machines, or network-connected copy machines, image data is stored in an image memory. The image data is then called from the image memory whenever required and used for printing images. When storing the image data in the image memory, a file name is automatically attached to the image data. The file name is created with the date and the time at which scanning was carried out. Moreover, a predetermined extension is provided to the file name. However, contents of file can not be guessed from the file name. Therefore, a user must open the file to see the contents of the file, which is time consuming. Moreover, such file names are not convenient when searching a required file.

SUMMARY OF THE INVENTION

It is an object of the present invention to provide an information processing apparatus that can automatically provide a name, which reflects the contents, to an image file.

An information processing apparatus according to an aspect of the present invention includes a character identifying unit that performs character identification with respect to an image in an image data; and a file name setting unit that sets a file name of the image data based on a character or a character string obtained as a result of the character identification.

A computer program according to another aspect of the present invention contains instructions which when executed on a computer causes the computer to execute performing character identification with respect to an image in an image data; and setting a file name of the image data based on a character or a character string obtained as a result of the character identification.

A computer-readable storage medium according to still another aspect of the present invention stores therein the above computer program according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of an information processing apparatus and a computer product according to the present invention are explained below while referring to the accompanying drawings.

The present embodiment is an example in which an information processing apparatus is used in a so called digital color copy machine that includes various functions such as of photocopying, faxing, printing, scanning, and transmitting an image that is input (an image that is read by scanning a document, or an image that is input by an own function as a printer or an own function as a FAX).

Figure 1:
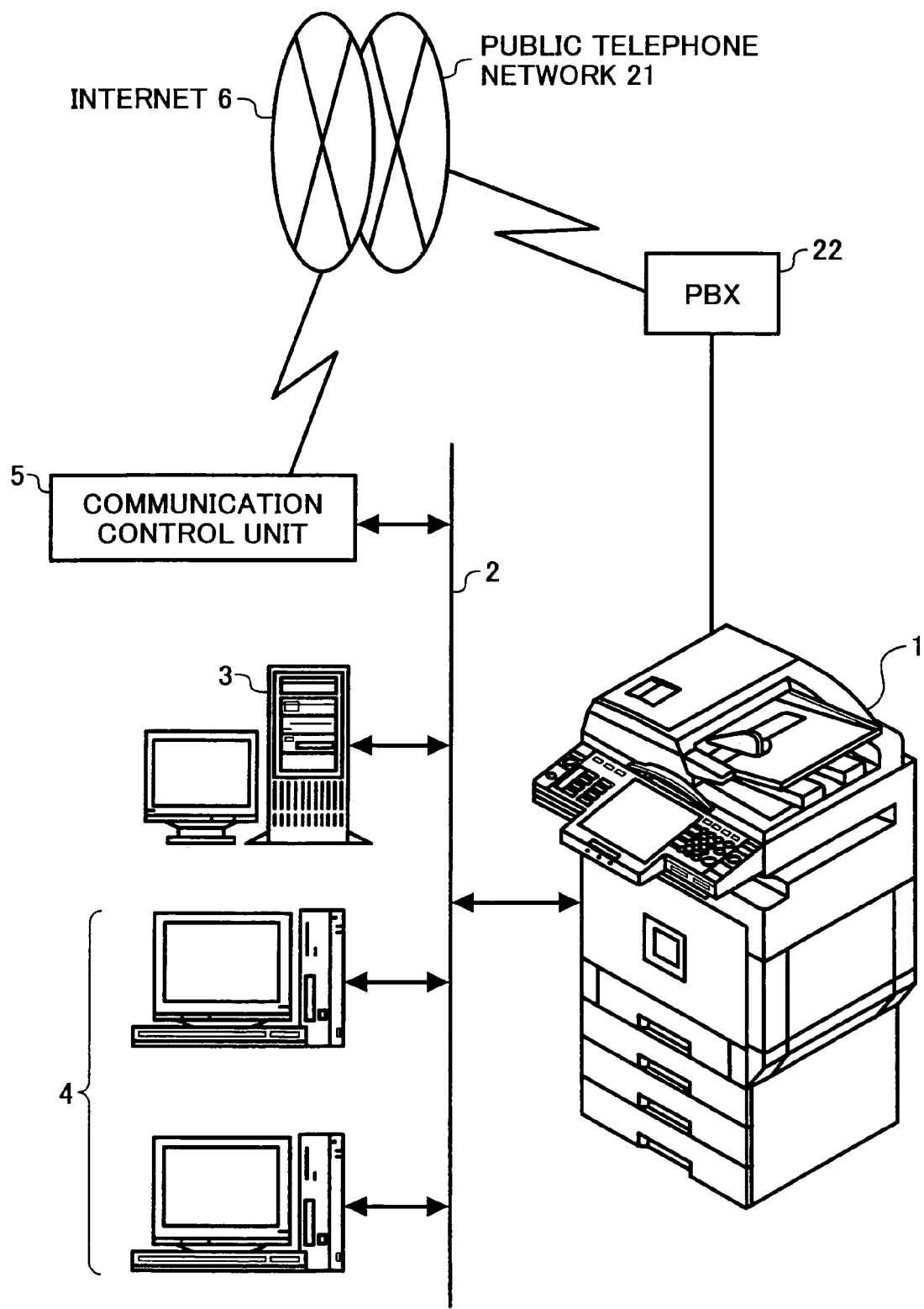
FIG. 1 is a configuration of a system that includes a digital color copy machine according an embodiment of the present invention.

FIG. 1 is a configuration of a system that includes a digital color copy machine 1 according to an embodiment of the present invention. The system includes a server computer 3 and client computers 4 that are connected to the digital color copy machine 1 via a local area network (LAN) 2. The server computer 3 and the client computers 4 are information processing apparatuses that execute various kinds of information processing. The server computer 3 supports protocols such as a file transfer protocol (FTP) and a hyper text transfer protocol (HTTP). The server computer 3 can function as a Web server, a mail server, and a domain name server (DNS). In other words, the system provides an environment in which image processing functions, such as image input, image output, and image storage, in the digital color copy machine 1, can be shared over the LAN 2.

The system is connected to the. Internet 6 via a communication control unit 5, thereby enabling data communication with an external environment. The communication control unit 5 is a router, a modem, or a digital subscriber line (DSL) modem. However, any other structure that supports transmission control protocol/internet protocol (TCP/IP) communication may also be used. The LAN 2 may be wired or wireless. Wireless communication can be achieved, for example, by infrared rays and radio waves. Wired communication can be achieved, for example, using optical fibers.

Figure 2:
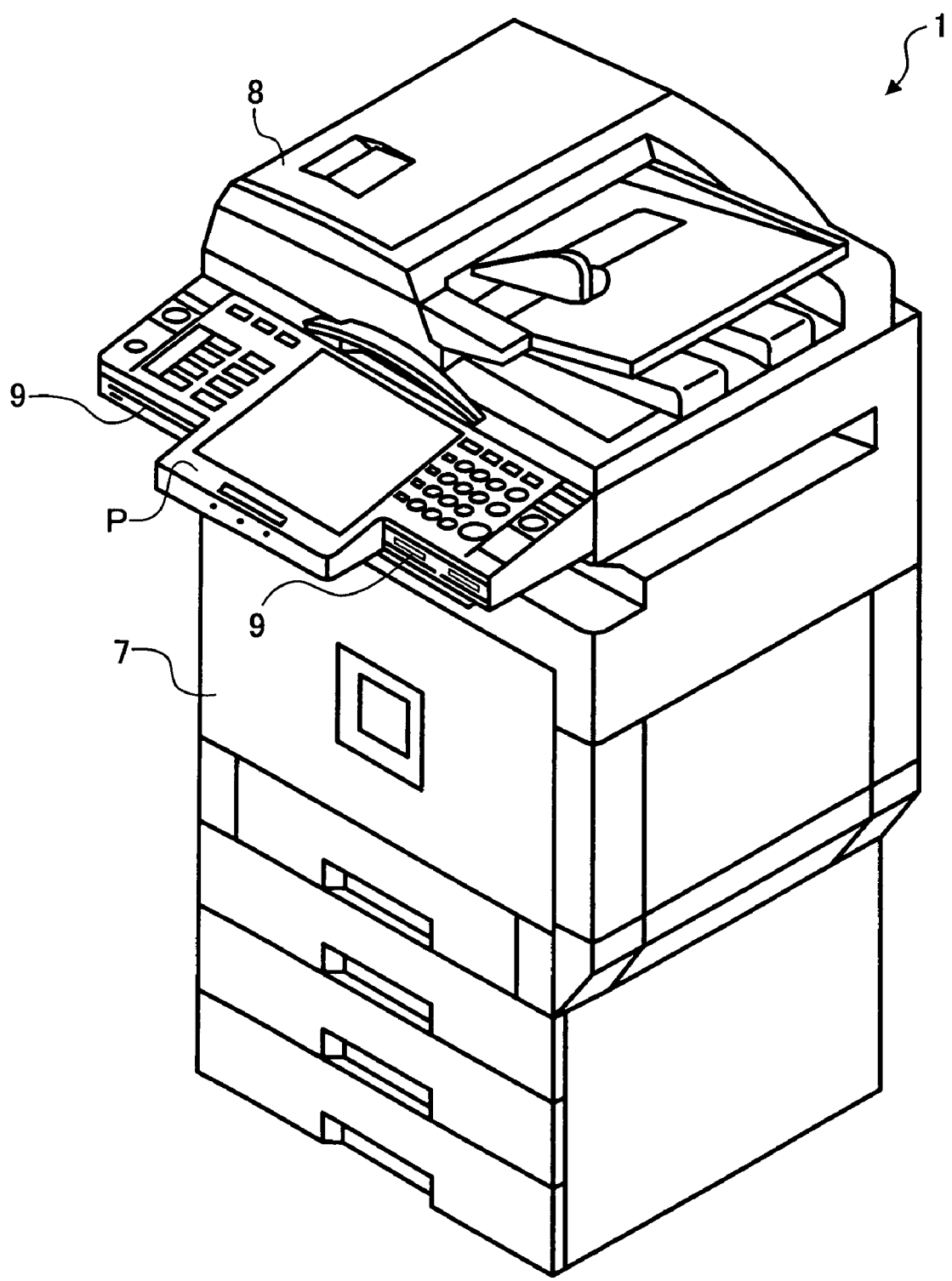
FIG. 2 is a perspective view of the digital color copy machine.
Figure 3:
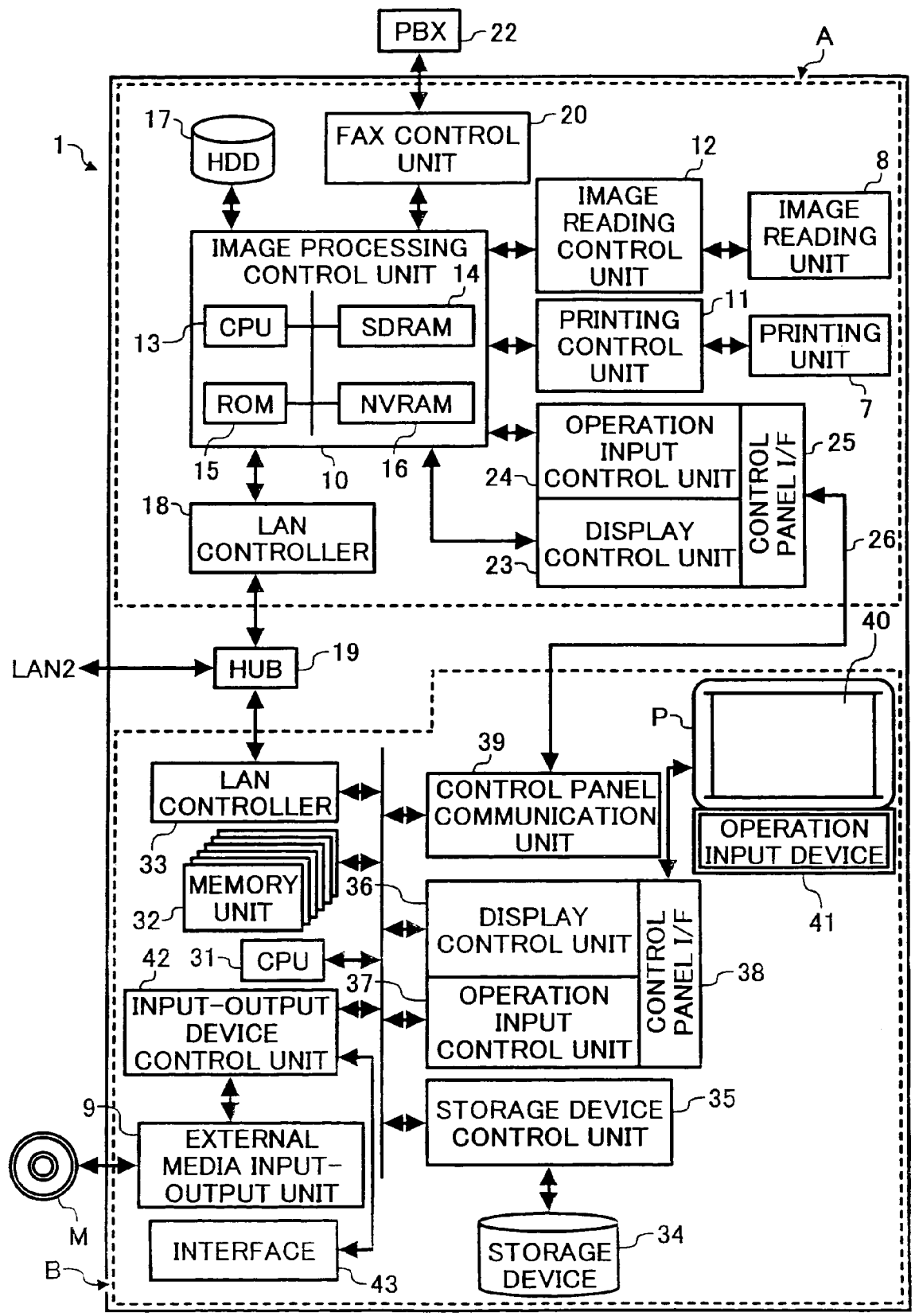
FIG. 3 is a functional block diagram of the digital color copy machine.

The digital color copy machine 1 will now be described in detail. FIG. 2 is a perspective view of the digital color copy machine 1 and FIG. 3 is a functional block diagram of the digital color copy machine 1. As shown in FIG. 2, the digital color copy machine 1 includes a printing unit 7, an image reading unit 8, an operation panel P, and an external media input-output unit 9. The printing unit 7 is an image forming unit that forms an image on a medium such as a transfer paper. The image reading unit 8 is disposed above the printing unit 7, and reads an image of a document. The external media input-output unit 9 is disposed below the operation panel P. The external media input-output unit 9 can read image files and program codes form a storage medium M (refer to FIG. 3), and can write image files and program codes on the storage medium M. The external media input-output unit 9 has an opening through which a storage medium M can be inserted. This opening is located at such a position that a storage medium M can be inserted in it easily.

The digital color copy machine 1 includes an image processing unit A and an information processing unit B as shown in FIG. 3. The printing unit 7 and the image reading unit 8 are included in the image processing unit A. The operation panel P and the external media input-output unit 9 are included in the information processing unit B.

The image processing unit A further includes an image-processing control unit 10 that controls image processing in the image processing unit A. A printing control unit 11 and an image-reading control unit 12 are connected to the image-processing control unit 10. The printing control unit 11 controls the printing unit 7 and the image-reading control unit 12 controls the image reading unit 8.

The image-processing control unit 10 controls the printing control unit 11. According to control of the image-processing control unit 10, the printing control unit 11 outputs instructions to print data including image data to the printing unit 7. The printing unit 7 forms and outputs an image on a medium such as transfer paper. The printing unit 7 is capable of full-color printing. The printing unit 7 can be realized using any known printing methods such as thermal sublimation transferring, silver halide photography, direct thermal recording, and hot melt thermal transferring may be employed, besides electrophotography.

The image-reading control unit 12 drives the image reading unit 8 under the control of the image-processing control unit 10. The image reading unit 8 optically reads the image of the document. Precisely, a lamp irradiates a light on the document, and the light reflected from the document is received by a photoreceptor via a mirror or a lens. The photoreceptor is, for example, a charge coupled device (CCD). The image-reading control unit 12 performs analog to digital conversion of the read image, and creates digital image data of eight bits of each of red, green, and blue (RGB).

The image-processing control unit 10 is a microcomputer that includes a central processing unit (CPU) 13, a synchronous dynamic random access memory (SDRAM) 14 as a memory device, a read only memory (ROM) 15, and a nonvolatile random access memory (NVRAM) 16 which are connected by a bus. The CPU 13 is the main processor. The SDRAM 14 stores the image data. The ROM 15 stores control programs etc. The NVRAM 16 holds data which has information such as system log, system setting, and log information recorded in it, even when the power supply is put OFF.

A hard disk drive (HDD) 17, a LAN controller 18, and a FAX control unit 20 are connected to the image-processing control unit 10. The HDD 17 stores job history and image data in a large quantity. The LAN controller 18 connects the image processing unit A to the LAN 2 via a HUB 19 inside the unit that is a line concentrator. The FAX control unit 20 performs the FAX control. The FAX control unit 20 is connected to an exchanger (PBX) 22 that leads to a public telephone network 21, thereby enabling the digital color copy machine 1 to communicate with a remote FAX.

Further, a display control unit 23 and an operation-input control unit 24 are connected to the image-processing control unit 10. The display control unit 23 outputs an image-display control signal to the information processing unit B via a communication cable 26 that is connected to a control panel I/F 25 by the control by the image-processing control unit 10, and performs the control of the image display of the operation panel P of the information processing unit B. The operation-input control unit 24 inputs an input control signal according to the function setting and the input operation by an operator from the operation panel P in the information processing unit B via the communication cable 26, which is connected to the control panel I/F 25, by the control by the image-processing control unit 10. In other words, the image processing unit A can directly monitor the operation panel P via the communication cable 26.

Therefore, in the image processing unit A, the communication cable 26 is connected to the image processing unit that is included in the conventional image processing apparatus, and the operation panel P in the information processing unit B is used. In other words, the display control unit 23 and the operation-input control unit 24 in the image processing unit A operate as units connected to the operation panel P.

The image processing unit A analyzes a command that carries printing instructions and printing data as image information from the external devices (the server computer 3, the client computer 4, and the facsimile etc.), performs bitmap conversion of the printing data so that the printing data can be printed as output image data, then analyses the printing mode from the command, and determines the operation. The printing data and the command are received either via the LAN controller 18 or via the FAX control unit 20.

The image processing unit A can transfer document reading data and printing data stored in the SDRAM 14 and the HDD 17, can output image data that is processed for outputting the document reading data and the printing data, and compressed data obtained by compressing the document reading data and the printing data, to external devices (i.e. to the server computer 3, the client computer 4, and to the facsimile etc.).

Further, the image processing unit A transfers the image data that is read by the image reading unit 8 to the image-processing control unit 10. The image processing unit A, then, applies correction to the signal deterioration caused due to quantization of an optical system and a digital signal, and writes this image data in the SDRAM 14. Thus, the image data stored in the SDRAM 14 is converted into output image data in the printing control unit 11, and is output to the printing unit 7.

The information processing unit B is now explained in detail. The information processing unit B has a structure of a microcomputer that is controlled by a general-purpose operating system (OS) which is used in an information processing unit called as a personal computer in general. The information processing unit B includes a CPU 31 which is a main processor. The CPU 31 includes a memory unit 32 and a storage-device control unit 35 that are connected by the bus connection. The memory unit 32 includes a read only memory (ROM) that is a memory exclusively for reading and has a start-up computer program and random access memory (RAM) that is a working area of the CPU 31, stored in it. The storage-device control unit 35 controls input and output of data to and from a storage device 34 such as an HDD which stores the OS and an application program.

A LAN controller 33 that connects the information processing unit B to the LAN 2 via the HUB 19 is connected to the CPU 31. An Internet protocol (IP) address that is a network IP address assigned to the LAN controller 33 is different from the IP address that is assigned to the LAN controller 18 of the imaged processing unit A. Thus, the digital color copy machine 1 is assigned with two IP addresses. In other words, the image processing unit A and the information processing unit B are connected to the LAN 2 and the data exchange between the image processing unit A and the information processing unit B is possible.

Since the digital color copy machine 1 is connected to the LAN 2 via the HUB 19, apparently it looks as if only one IP address is assigned. Therefore, wiring connections etc. can be made easily without disturbing the neat appearance.

Figure 4:
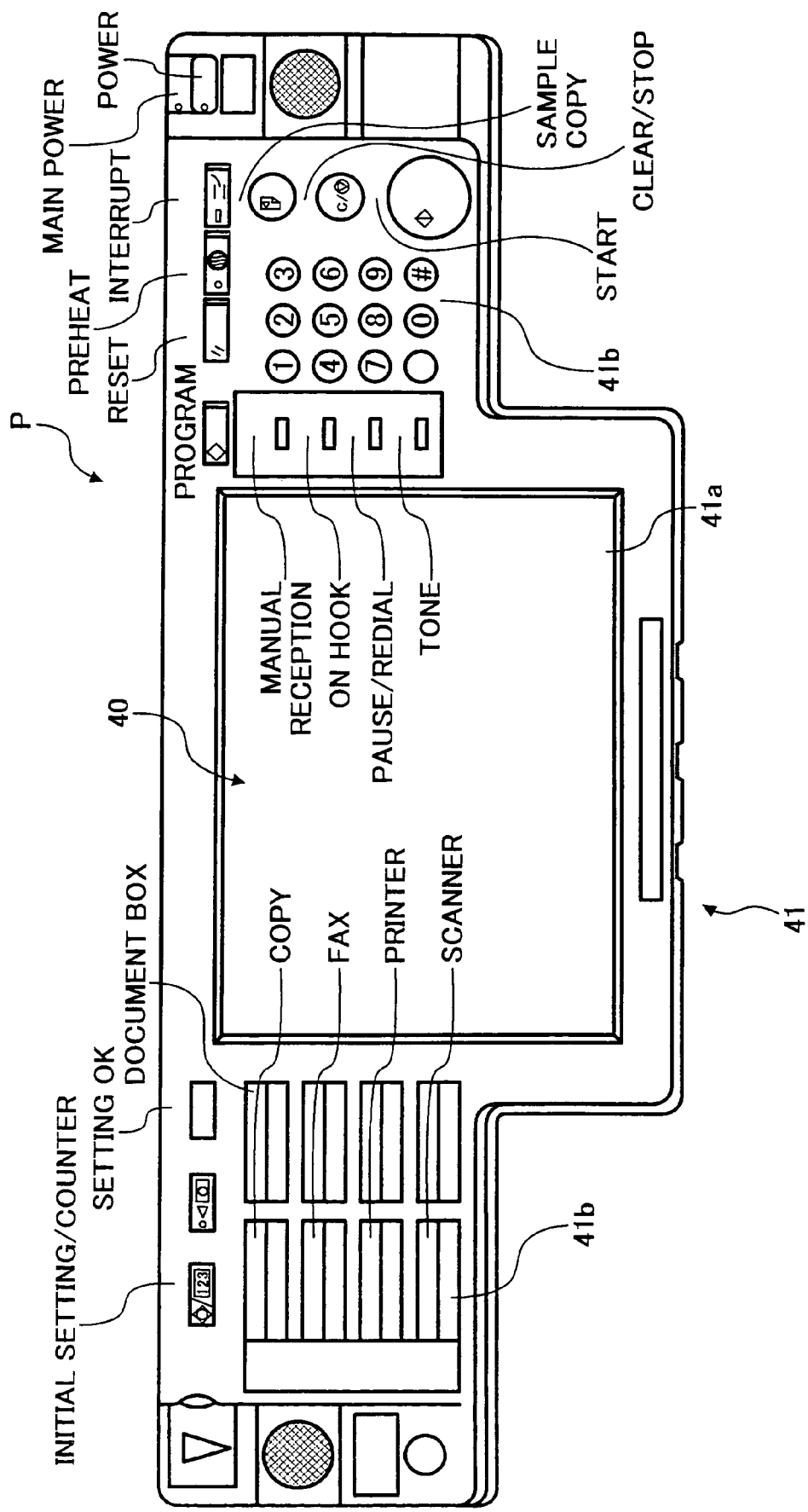
FIG. 4 is a top view of an operation panel.

Moreover, an operation-input control unit 37 and a display control unit 36 that controls the operation panel P are connected to the CPU 31. FIG. 4 is a top view of the operation panel P. The operation panel P includes a display unit 40, which is, for example, a liquid crystal display (LCD), and an operation-input device 41. The operation-input device 41 includes a touch panel 41a and a keyboard 41b. The touch panel 41a is of a type such as ultrasonic and acoustic waves laminated on the display unit 40 and the keyboard 41b includes a plurality of keys. The keyboard 41b includes keys such as a start key to indicate start of image reading, a numeric key pad to input values, a reading-condition setting key to set destination to which the image data read is transmitted, and a clear key. Thus, the display control unit 36 outputs the image-display control signal to the display unit 40 via a control panel I/F 38, and displays, on the display, predetermined items in accordance with the image-display control signal unit 40. On the other hand, the operation-input control unit 37 receives an input control signal according to the function setting and the input operation by the operator at the operation-input unit 41 via the control panel I/F 38.

A control panel communication unit 39 that is connected to the control panel I/F 25 in the image processing unit A via the communication cable 26 is connected to the CPU 31. The control panel communication unit 39 receives the image-display control signal that is output from the image processing unit A, and transmits an input control signal according to the function setting and the input operation by the operator at the operation panel P to the image processing unit A. More concretely, the image-display control signal from the image processing unit A that is received at the control panel communication unit 39 is subjected to data conversion to be displayed on the display unit 40 in the operation panel P, and then, is output to the display control unit 36. The input control signal according to the function setting and the input operation by the operator at the operation panel P is subjected to data conversion to correspond to a format according to the specifications in the image processing unit A, and then, is input to the control panel communication unit 39.

Thus, the application program and the OS to be executed by the CPU 31 are stored in the storage device 34. In this context, the storage device 34 functions as a storage medium that stores the application program. In this digital color copy machine 1, when the user turns power on, the CPU 31 starts a start-up program stored in the memory unit 32, and reads the OS stored in the storage device 34 into the RAM inside the memory unit 32 to start the OS. The OS enables the computer program to be executed according to the user's operation, reads and saves information. Windows (registered trademark) is an example of a typical OS. Operation program running on such the OS is called as an application program. The OS for the information processing unit B is a same OS as the OS for the information processing unit (such as the server computer 3 and the client computer 4), i.e. a general-purpose OS such as Windows (registered trademark).

The digital color copy machine 1 includes the external media input-output unit 9 that can handle a flexible disk drive, an optical disk drive, a magneto-optical disk drive, and a semiconductor media drive. These types of drives read code included in a computer program and an image file etc. which are stored in the storage medium M such as a flexible disk (FD), a hard disk, an optical disk (such as a compact disc-read only memory (CD-ROM), compact disc-recordable (CD-R), digital versatile disc-read only memory (DVD-ROM), digital versatile disc-read only memory (DVD-ROM), digital versatile disc-random access memory (DVD-RAM), digital versatile disc-recordable (DVD-R), DVD+R, digital versatile disc-rewritable (DVD-RW), and DVD+RW), a magneto-optical disk (MO), and a semiconductor medium. Program codes (control computer program) such as various application programs of OS and drives, and image files are stored in the storage medium M. Such the external media input-output unit 9 functions as a reading unit that reads data stored in a medium. The external media input-output unit 9 is controlled by an input-output device control unit 42 that is connected to the CPU 31 by the bus connection.

The application program to be stored in the storage device 34 may be an application program obtained by installing an application program stored in the storage medium M. Therefore, the storage medium M can also function as the storage medium that stores the application program. Moreover, the application program may be obtained from an external source via the Internet 6 and the LAN 2 to be installed in the storage device 34.

Various interfaces 43, such as a universal serial bus (USB), IEEE 1394, and a small computer system interface (SCSI), are connected to the input-output device control unit 42. Various external equipments (such as a digital camera) can be connected via these interfaces 43.

In the digital color copy machine 1, when an image file that includes image data read from a document by the image reading unit 8, or image data of an image faxed from an external device, and that is received via the FAX control unit 20 is saved in the storage device 34, a file name can be given to the image file automatically. An automatic naming process is executed according to a predetermined application program that is installed in the storage device 34. The application program installed has either been read from the storage medium M, or been downloaded from the Internet 6. The following is a description of the automatic naming process that is performed in the digital color copy machine 1.

To start with, in the image processing unit A, a temporary file name is imparted to an image file. The image file that has the temporary file name is transmitted to the information processing unit B.

Figure 5:
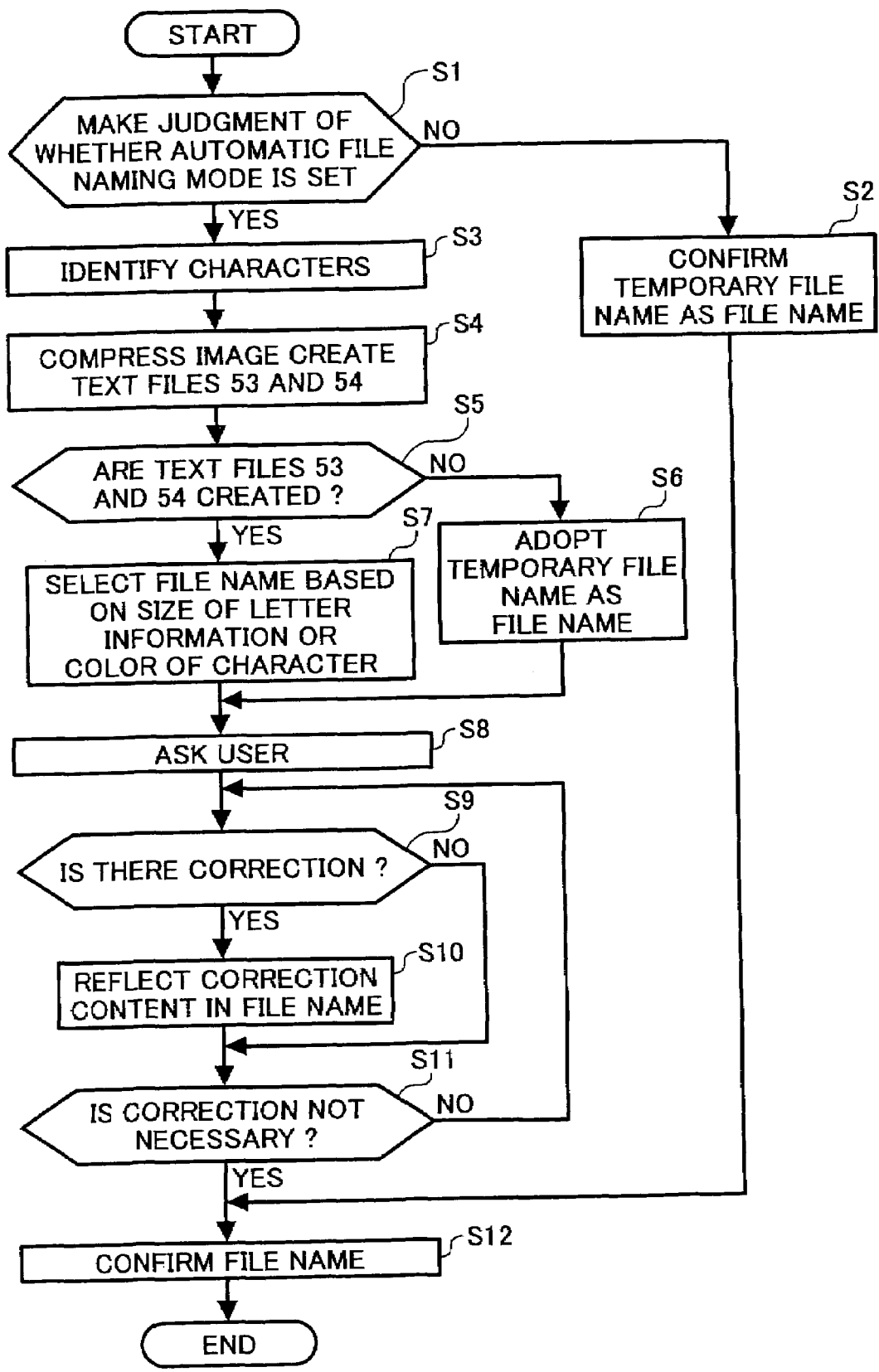
FIG. 5 is a flow chart of an automatic naming process executed by the digital color copy machine.

FIG. 5 is a flow chart of the automatic naming process that is executed by the CPU 31. To start with, the CPU 31 makes a judgment of whether automatic file naming mode is set or not (step S1). In the automatic file naming mode, the automatic file naming process is executed. The automatic file naming mode can be set in advance with a predetermined operation in the operation-input device 41. If the automatic file naming mode is not set (N at step S1), the temporary file name that is imparted in the image processing unit A is confirmed as the file name of the image file (step S2). The file name in such a case is formed with a date and time of reading of the document by the image reading unit 8, and a predetermined extension.

Figure 6:
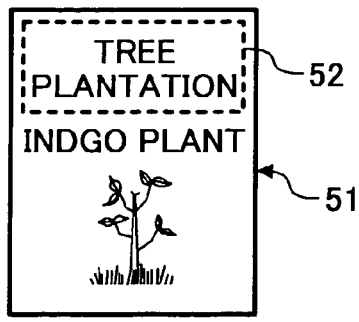
FIG. 6 is an image included in an image file that is to be named automatically.
Figure 7:
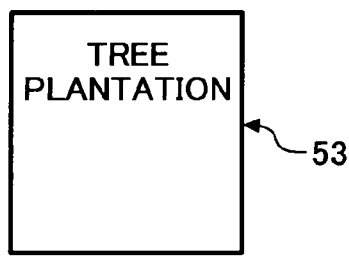
FIG. 7 is a text file in which characters obtained by character identification from the image are included.
Figure 8:
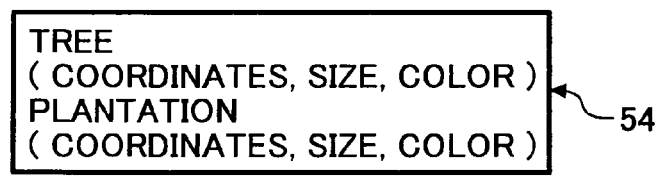
FIG. 8 is a text file that includes coordinates and size or color of the characters obtained by the character identification.
Figure 9:
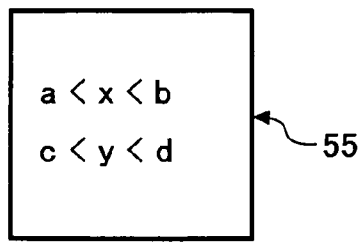
FIG. 9 is a test file that includes coordinates of a preset area.

If the automatic file naming mode is set (Yes at step S1), the following process is executed. FIG. 6 is an example of an image 51 in the image file that is read by the image reading unit 8. First, character identification (by a character identification unit) in an area (pre-set area) 52, in the image 51, that is set in advance, and that is specified by predetermined xy coordinates is performed (step S3). The xy coordinates of the pre-set area 52 are recorded and saved in advance in a text file 55 (FIG. 9). An arrangement may be made such that a user can set the xy coordinates at a desirable position. The character identification process in this case uses a known optical character reader (OCR) technology, which is generally used. Thus, when the characters or the character strings are identified by the character identification process, a text file 53 (FIG. 7) that includes the characters or character strings, is created. This image file is subjected to compression coding by a predetermined image compression algorithm such as JPEG (Joint Photographic Expert Group) and JPEG 2000. Moreover, for each of the characters identified by the character identification process, coordinate that indicates a position of the character in the text file 53 is detected. Further, letter size and color of the character in the image 51 are detected (size detection unit, color detection unit). Then, a text file 54 (FIG. 8) that includes information of the coordinate in the image 53, the letter size and the color of the character is created (step S4).

If the pre-set area 52 does not include any character, and if the text files 53 and 54 are not created (N at step S5), the temporary file name imparted in the image processing unit A is adopted as the file name of the image file (step S6). In this case, the file name includes a date and time of reading the document by the image reading unit 8, and a predetermined extension.

If the pre-set area 52 includes characters, and if the text files 53 and 54 are created (Y at step S5), based on the information of the letter size or the color of the characters that are recorded in the text file 54, certain characters or character strings are selected from the characters or the character strings in the text file 53 (file name setting unit). The characters or character strings thus selected are adopted as the file name (step S7).

Concretely, in a case where the characters to form the file name are selected based on the information of the letter size, because characters written in relatively large letter are often used in a title, which is likely to plainly express contents of the document, these characters in relatively large letter are selected as the file name. An arrangement may be done so that characters that is written in the largest letter size in the text file 53, or characters that is written in letter size larger than certain size are selected to form the file name.

In a case where the characters to form the file name are selected based on the information of the color, because characters that is written in different color from color of most of characters are often appear in a title, which is likely to plainly express contents of the document. For example, if characters or character strings of red and blue color are included in a document while most of characters in the document are in black color, the characters of red and blue color are likely to be used in the title of the document. Therefore, such characters of specific color are selected as the file name.

Thus, when the file name is determined in steps S6 and S7, the file name is displayed on the display unit 40, and a message that asks if the user wishes to correct the file name (step S8). When the user corrects the file name (Y at step S9) by operating a soft key board that is displayed on the display unit 40, the correction is reflected in the file name (step S10). When the user, by operating the keyboard, indicates an intention not to apply any further correction (Y at step S11), the file name at this point is confirmed as the file name of the image file. The confirmed file name is imparted to the image file and stored in the storage device 34 (step S12).

In many cases, in a document, predetermined characters or character strings which indicate a "subject" or a "title" are written in larger letters than characters in other parts, or written in different color from characters in the other parts. Therefore, by performing such a process, a name that accurately reflects the contents of the image 51, and that informs about the contents of the image 51 can be imparted automatically.

An example other than the process in FIG. 5 is described below with reference to FIG. 10.

Figure 10:
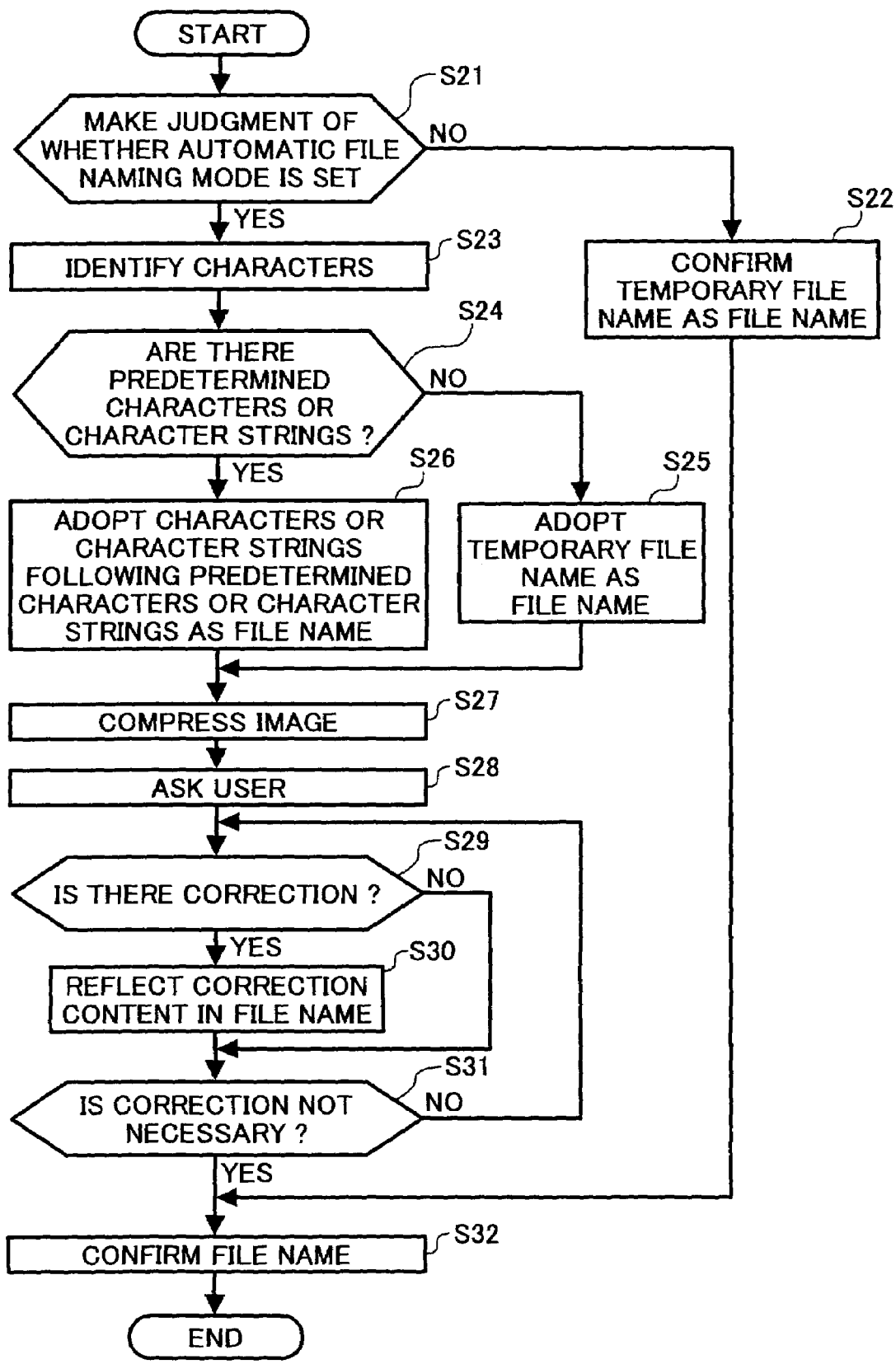
FIG. 10 is a flow chart of another example of the automatic naming process that is executed by the digital color copy machine.

As shown in FIG. 10, to start with, the CPU 31 makes a judgment of whether the automatic file naming mode is set or not (step S21). If the automatic file naming mode is not set (N at step S21), the temporary file name that is imparted in the image processing unit A is confirmed as the file name of the image file (step S22).

If the automatic file naming mode is set (Y at step S21), the following process is executed. To start with, in this example, the character identification is performed for the whole area of the image 51 (step S23). The character identification process in this case also uses the known OCR technology, which is generally used. When characters or character strings are identified by the character identification process, a judgment of whether the characters or the character strings include predetermined characters or character strings that are set in advance is made (step S24). The predetermined characters or character strings are, for example, "subject" or title" that are usually followed by characters or character strings that plainly express contents of the document.

If such the predetermined characters or character strings are not identified (N at step S24), the temporary file name that is imparted in the image processing unit A is adopted as the file name of the image file (step S25).

If such the predetermined characters or character strings are identified (Y at step S24), the characters or the character strings that follow the predetermined characters or character strings are adopted as the file name of the image file (step S26). The image file 51 is subjected to compression coding by a known image compression algorithm (step S27).

Thus, once the file name is determined in steps S25 and S26, processes in steps S28 to S32 are executed. The remaining process is similar to the process mentioned in steps S8 to S12, and hence the detailed description is omitted here.

By performing the process shown in FIG. 10, in many cases the characters or character strings that follow the predetermined characters or the character strings, such as "subject" and "title" display the title of the document that plainly expresses the contents of the document. Therefore, a file name that reflects the contents of the image 51 accurately, and that informs about the contents of the image, can be imparted automatically.

According to an aspect of the present invention, because a file name is formed with characters that are included in an image, a file name that reflects the image, and that informs about the image can be imparted automatically.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus that processes image data received by a facsimile or by a scanner, the apparatus comprising:
a character identifying unit that performs character identification with respect to an image in the image data; and
a file name setting unit that sets a file name of the image data
based on, when the character identifying unit identifies a character or a character string, the character or the character string obtained as a result of the character identification, and
based on, when the character identifying unit does not identify a character or a character string, a date or a time when the image data was received or acquired.

2. The information processing apparatus according to claim 1, wherein the file name setting unit sets the file name based on a character or a character string that is after a predetermined number of characters in the character or the character string obtained as a result of the character identification.

3. The information processing apparatus according to claim 1, further comprising a size determining unit that determines a letter size of the character or each character in the character string obtained as a result of the character identification, wherein
the file name setting unit sets the file name based on a character or a character strings having the biggest letter size.

4. The information processing apparatus according to claim 1, further comprising a color determining unit that determines a color of the character or each character in the character string obtained as a result of the character identification, wherein
the file name setting unit sets the file name based on a predetermined color included in the color determined by the color determining unit.

5. The information processing apparatus according to claim 3, wherein the character identification unit performs character identification in a predetermined area of the image.

6. The information processing apparatus according to claim 4, wherein the character identification unit performs character identification in a predetermined area of the image.

7. The information processing apparatus according to claim 1, further comprising a text file creating unit that creates a text file including at least one of location coordinates, size, and color of the character or the character string obtained as a result of character identification.

8. The information processing apparatus according to claim 1, wherein the character identifying unit performs character identification only in a predetermined area of the image.

9. The information processing apparatus according to claim 1, further comprising:
a location retrieving unit that retrieves xy coordinates of a predetermined area of the image from a text file,
wherein the character identification unit performs character identification only in the predetermined area of the image.

10. The information processing apparatus according to claim 1, further comprising:
a keyword recognition unit that recognizes as a keyword at least one predetermined character in the character or the character string obtained as a result of the character identification, wherein
the file name setting unit sets the file name based on a character or a string of characters in the image data that follows the keyword recognized by the keyword recognition unit.

11. A method that processes image data received by a facsimile or by a scanner, the method comprising:
performing character identification with respect to an image in an image data; and
setting a file name of the image data
based on, when the performing character identification identifies a character or a character string, the character or the character string obtained as a result of the character identification, and
based on, when the performing character identification does not identify a character or a character string, a date or a time when the image data was received or acquired.

12. The method according to claim 11, wherein the setting includes setting the file name based on a character or a character string that is after a predetermined number of characters in the character or the character string obtained as a result of the character identification.

13. The method according to claim 11, further comprising:
determining a letter size of the character or each character in the character string obtained as a result of the character identification, wherein
the setting includes setting the file name based on a character or a character string having the biggest letter size.

14. The method according to claim 11, further comprising:
determining a color of the character or each character in the character string obtained as a result of the character identification, wherein
the setting includes setting the file name based on a predetermined color included in the color determined at the determining.

15. The method according to claim 11, further comprising:
creating a text file including at least one of location coordinates, size, and color of the character or the character string obtained as a result of the character identification.

16. The method according to claim 11, wherein the performing character identification identifies characters only in a predetermined area of the image.

17. The method according to claim 11, further comprising:
retrieving xy coordinates of a predetermined area of the image from a text file; and
performing character identification only in the predetermined area of the image.

18. The method according to claim 11, further comprising:
recognizing as a keyword at least one predetermined character in the character or the character string obtained as a result of the character identification, wherein
the setting includes setting the file name based on a character or a string of characters in the image data that follows the keyword recognized by the keyword recognition unit.

19. A computer-readable storage medium that stores a computer program that processes image data received by a facsimile or by a scanner and that contains instructions which when executed on a computer causes the computer to execute:
performing character identification with respect to an image in an image data; and
setting a file name of the image data
based on, when the performing character identification identifies a character or a character string, the character or the character string obtained as a result of the character identification, and
based on, when the performing character identification does not identify a character or a character string is not identified, a date or a time when the image data was received or acquired.

20. The computer-readable storage medium according to claim 19, wherein the setting includes setting the file name based on a character or a character string that is after a predetermined number of characters in the character or the character string obtained as a result of the character identification.

21. The computer-readable storage medium according to claim 19, further causes the computer to execute determining a letter size of the character or each character in the character string obtained as a result of the character identification, wherein
the setting includes setting the file name based on a character or a character string having the biggest letter size.

22. The computer-readable storage medium according to claim 19, further causes the computer to execute determining a color of the character or each character in the character string obtained as a result of the character identification, wherein
the setting includes setting the file name based on a predetermined color included in the color determined at the determining.

23. The computer-readable storage medium according to claim 19, further causes the computer to execute creating a text file including at least one of location coordinates, size, and color of the character or the character string obtained as a result of the character identification.

24. The computer-readable storage medium according to claim 19, wherein the performing character identification identifies characters only in a predetermined area of the image.

25. The computer-readable storage medium according to claim 19, further causes the computer to execute:
retrieving xy coordinates of a predetermined area of the image from a text file; and
performing character identification only in the predetermined area of the image.

26. The computer-readable storage medium according to claim 19, further causes the computer to execute:
recognizing as a keyword at least one predetermined character in the character or the character string obtained as a result of the character identification, wherein
the setting includes setting the file name based on a character or a string of characters in the image data that follows the keyword recognized by the keyword recognition unit.

* * * * *